C. B. BOYNTON.
Car-Axle Box.
No. 70,793.
Patented Nov. 12, 1867.
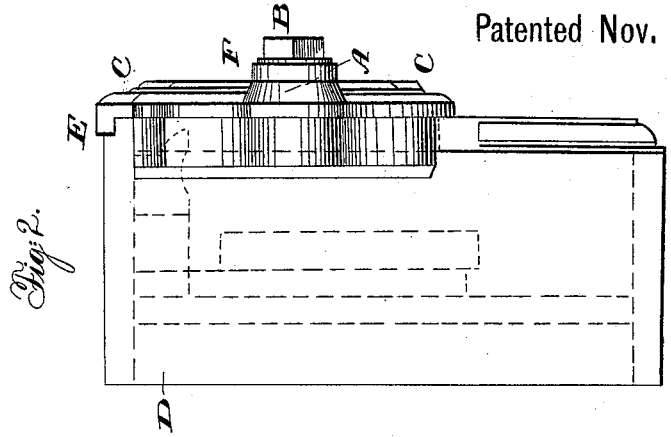
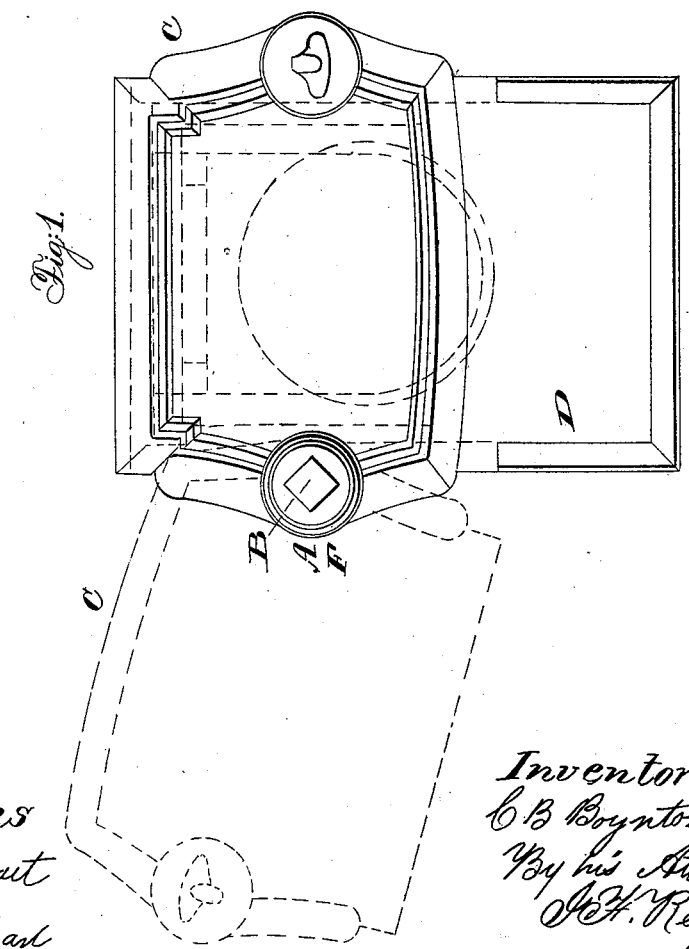

United States Patent Office.

C. B. BOYNTON, OF ST. PAUL, MINNESOTA.

Letters Patent No. 70,793, dated November 12, 1867.

---

RAILWAY AXLE-BOX.

---

*The Schedule referred to in these Letters Patent and making part of the same.*

---

TO ALL WHOM IT MAY CONCERN:

Be it known that I, C. B. BOYNTON, of St. Paul, Ramsey county, State of Minnesota, have invented new and useful Improvements in the Journal-Boxes of Railway Cars; and I do hereby declare the following to be an exact description thereof, reference being had to the accompanying drawings, and to the letters of reference marked thereon, making a part of this specification, in which—

Figure 1 represents a front view of the journal-box.

Figure 2, a cross-section.

The nature of my invention consists in the construction of the cover with its flange and the rubber under the washer of the bolt, upon which the cover or door operates.

A represents the rubber or circular spring that presses against the cover C by means of the washer F on the bolt B; the bolt B passing through the washer, the rubber A and end of cover C into the box D, holding the cover firmly to the box in whatever position the cover is placed, and the rubber A keeping the cover or lid A from rattling; and the lid is regulated by turning the head of screw-bolt B. The inside of the cover C has a raised rim all around it, so that the bearing against the box is only on the rim instead of the whole of the cover. The cover has a flange, E, on the inside, at the top, fitting into a shoulder at the top of the box, and this flange prevents the cover from falling down from its proper place.

What I claim as my invention, and desire to secure by Letters Patent, is—

The arrangement and combination of the rubber A under the washer of bolt B, the inside construction of cover C, also the flange E fitting on to the shoulder at the top of box D, as herein described and for the purpose set forth.

C. B. BOYNTON.

Witnesses:
OSCAR F. FORD,
J. Q. A. WARD.